United States Patent [19]
Levine

[11] 3,715,480
[45] Feb. 6, 1973

[54] MOTION DETECTION SYSTEM

[75] Inventor: Arnold M. Levine, Chatsworth, Calif.

[73] Assignee: International Telephone and Telegraph Corporation, New York, N.Y.

[22] Filed: Sept. 29, 1969

[21] Appl. No.: 861,751

[52] U.S. Cl. ....................178/6, 178/DIG. 33
[51] Int. Cl. ....................H04h 7/02
[58] Field of Search..............356/163, 164, 165, 168; 178/6.7, 6.8, DIG. 33, 33, 38

[56] References Cited

UNITED STATES PATENTS

| | | | |
|---|---|---|---|
| 3,436,473 | 4/1969 | McMann, Jr. | 178/DIG. 34 |
| 3,003,391 | 10/1961 | Land | 178/5.4 W |
| 2,597,636 | 5/1952 | Hall et al. | 178/DIG. 33 |
| 3,317,662 | 5/1967 | Robinson et al | 178/6.7 |
| 3,109,060 | 10/1963 | Beach et al. | 178/6.7 |
| 2,457,170 | 12/1948 | Mitchell | 356/163 |

OTHER PUBLICATIONS

Experiments in Color Vision by E. Land in "Scientific American", Vol. 200, pages 84–99, dated May, 1959.

*Primary Examiner*—Robert L. Griffin
*Assistant Examiner*—Barry Leibowitz
*Attorney*—C. Cornell Remsen, Jr., Walter J. Baum, Paul W. Hemminger, Percy P. Lantzy and Thomas E. Kristofferson

[57] ABSTRACT

A method and system for detecting object motion. Light emanating from a scene is filtered by a first filter and second filter and recorded by a first recording device and a second recording device, respectively. The signals from one of the recording devices is delayed with respect to the other recording device and then both signals are reproduced. At least one of the reproduced signals is again filtered and then both reproduced signals are then superimposed and a color reproduction suitable for detection by the human eye is produced. The reproducing means may be in the form of a phosphor screen which changes color as current density is changed, with each of the signals being alternately applied to the reproducing means. Alternatively, the recording device and reproducing means could be motion picture cameras and projectors or television cameras and receivers.

6 Claims, 5 Drawing Figures

ARNOLD M. LEVINE
INVENTOR

BY Harvey S. Hertz

ATTORNEY

ARNOLD M. LEVINE
INVENTOR
BY Harvey S. Hertz
ATTORNEY

MOTION DETECTION SYSTEM

The invention relates in general to motion detection systems, and more particularly, to a method and system for detecting object motion utilizing color vision.

BACKGROUND OF THE INVENTION

Conventional viewing of full color of images has normally been performed either by utilization of color film or color television. In "Scientific American", Vol. 200, Pages 84–99, dated May, 1959, there is an article written by Edwin H. Land entitled, "EXPERIMENTS IN COLOR VISION". The article describes how the human eye can make distinctions of amazing subtlety. By utilizing conventional black and white films, photographs were taken of the same object using a long wave length filter for one transparency and a shorter wave length filter for another transparency. Superimposing the two transparencies on a screen produced a black and white picture. However, when the filter with which one of the transparencies was taken was placed in front of the projecting lens of that transparency, the view changed to one of color. Further, the second filter could be placed in front of the second projecting lens of the second transparency, and a full, vivid color picture would result. The resulting explanation of the spectrum according to the article, is that the spectrum is an accidental consequence of arranging stimuli in order of wave length. The significant scale for images runs from warm colors through neutral colors to cool colors.

The use of color film or transparencies, or color television, has heretofore been more advantageous to ascertaining details of scenes. In contrast thereto, black and white film or black and white television, while not able to produce as distinguishing a detail as color film or color television, respectively, has the advantage of producing significant detail with more simplified equipment. Moreover, black and white film can be used where a minimum of light is present as compared to color film. Further, a color television camera and projector is actually three superimposed cameras and projectors, respectively, thus requiring a complex arrangement of equipment. As can readily be seen, the advantages of the system described in the aforegoing "-Scientific American" article affords the possibility of producing color photographs utilizing black and white film or black and white television cameras.

In the field of motion detection, two scenes are compared by an observer to determine differences in the scenes so as to detect movement in two photographs. The use of color film has been found in photographic analysis to be more advantageous than black and white film in ascertaining details of scenes. Color film does not exhibit granularity whereas black and white film, while not able to produce as distinguishing a detail as color film, has the advantage of producing significant detail with more simplified equipment. Moreover, black and white film can be utilized where the level of ambient light is low, and processing thereof is relatively simple in comparison to color film.

Simultaneously, where television is utilized for motion surveillance, whereas color television would be more desirable for ascertaining certain details in the scene being viewed, both color television cameras and projectors are quite complex and each actually are three superimposed cameras and projectors, respectively. Thus, a black and white television camera and receiver, while not producing significant distinguishing details, is relatively simple to operate and requires a minimum of skill.

In order to overcome the attendant disadvantages of prior art motion detection techniques utilizing color photography, the present invention combines the advantage of black and white photography and its rapid simplified processing with the observer viewing abilities of color photography. Moreover, in the field of television, the present invention combines the simplified black and white television system with the obvious image details produced by a color system. Moreover, the system allows rapid scanning by an observer of photographs or a television monitor to determine if motion detection has occurred.

The advantages of this invention, both as to its construction and mode of operation will be readily appreciated as the same become better understood by reference to the following detailed description when considered in connection with the accompanying drawings in which like referenced numerals designate like parts throughout the figures.

DESCRIPTION OF THE PREFERRED EMBODIMENT

Figure 1:
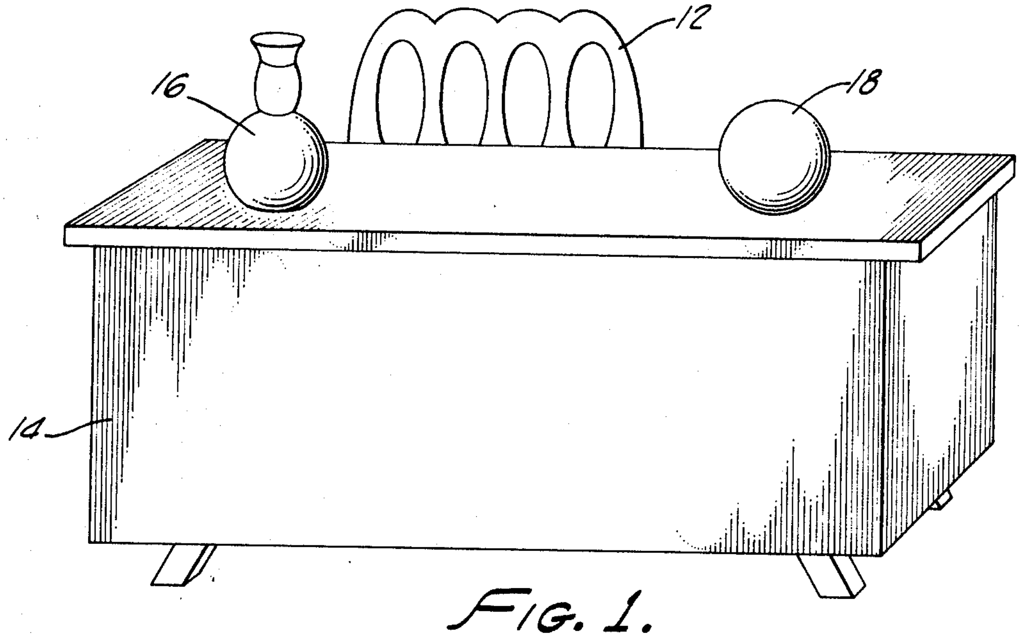
FIG. 1 depicts a typical scene for illustration purposes in order to explain the principles of the invention.

Referring now to FIG. 1, there is shown a scene containing a chair 12 and desk 14. The desk contains a pair of articles 16 and 18 on its top. Should FIG. 1 be taken with film to produce a pair of black and white transparencies simultaneously, utilizing filters as described in the aforementioned "Scientific American" article, and projected upon a screen, utilizing filters also described in the article, a color display would be present on the screen of FIG. 1. Further, should the black and white transparencies be taken at different times, and then displayed simultaneously, the same resultant color display would be present.

Figure 2:
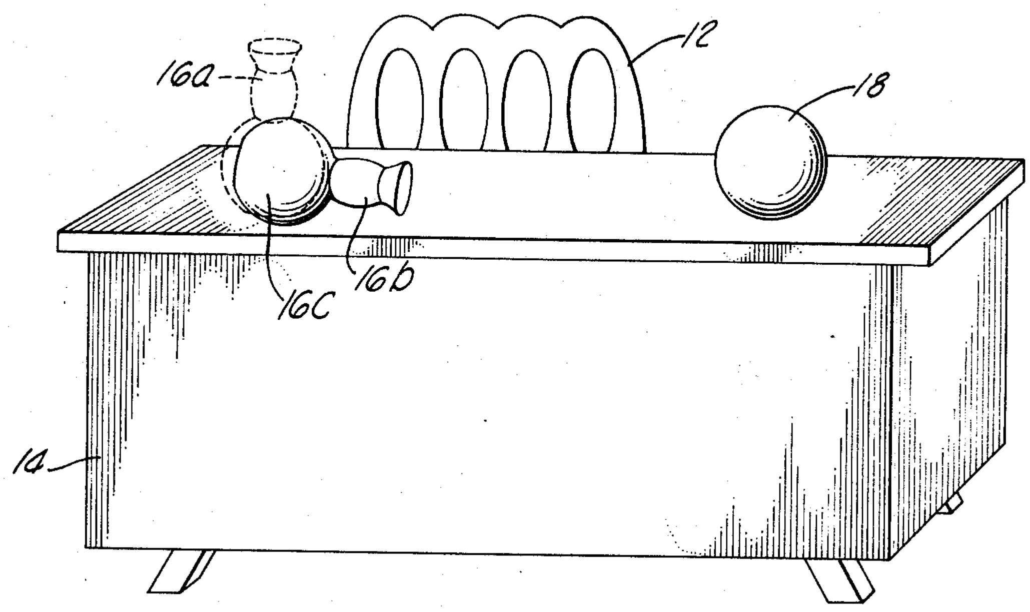
FIG. 2 illustrates the scene of FIG. 1 wherein an object in the scene has been moved.

Consider now, however, that should the two transparencies be taken at different times, with movement of the articles occurring during the time interval between photographs. In FIG. 2, such a display is seen with the dotted line depicting the position of the object 16 prior to movement, whereas the solid line depicts the position of the object 16 after movement has ceased, that is, after the second picture has been taken. Considering further that the first picture were taken with a red filter and the second picture taken with a green filter, and consider further, that the object 16 is yellow. The portion 16*a* of the object 16 wholly within the dotted lines will be substantially red, whereas the portion 16*b* of the object 16 wholly within the solid lines will be substantially green, and the portion 16c of the object contained within both the solid and dotted line will be yellow. It should be understood, of course, that the color of portion 16*a* will be affected by the portion of the wall behind the desk and the portion of the desk which is taken with the green filter during the second photograph, while simultaneously, the color of the portion 16*b* will be affected by the portion of the wall taken with the red filter and the portion of the desk taken with the red filter in the first photograph. With the foregoing in mind, it is readily apparent that one viewing the picture could readily detect movement in the picture by viewing the difference in color as presented by the object 16 as described above.

Figure 3:
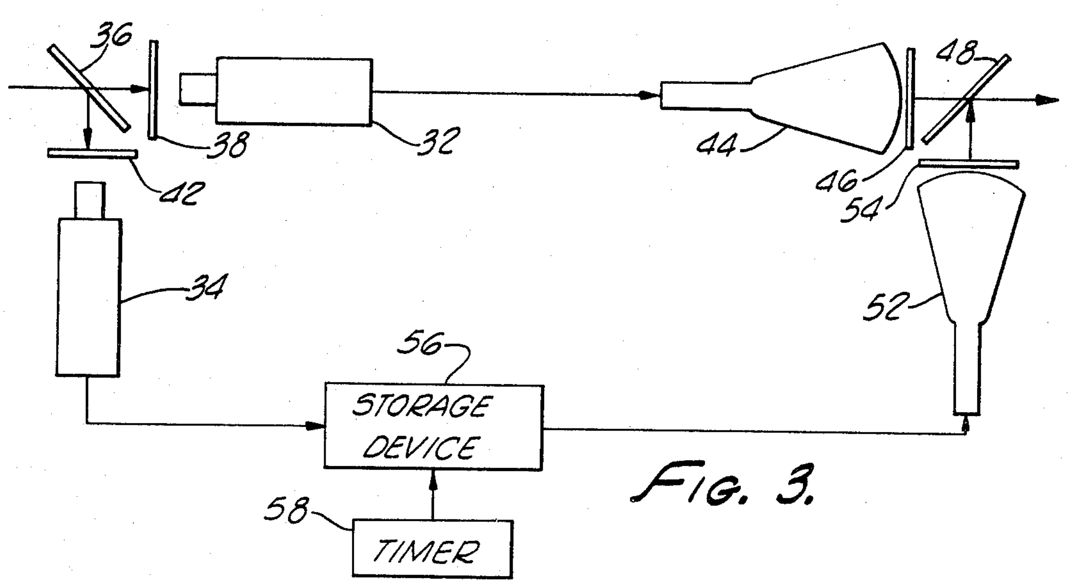
FIG. 3 shows a schematic arrangement of one embodiment of the motion detection system.

Referring now to FIG. 3, there is shown an arrangement of television equipment utilizing conventional television projectors and cameras for detecting motion embodying principles of the invention. The equipment could be used, for example, in surveillance equipment to detect movement of an object or person in a room by a viewer of a television screen. The equipment comprises a first conventional black and white television camera 32 and a second conventional black and white television camera 34. Objects or scenes being viewed are received by a beamsplitter such as a half-silvered dicloric mirror 36, half of the light energy being transmitted to the camera 32 through a filter 38 installed in front of the lens of the camera 32, which may be, for example, red in color, and the other half of the light energy being projected through a filter 42 such as a green filter, placed in front of the lens of camera 34. Images from the camera 32 are transmitted to a television receiver 44 and a red filter 46, similar to the filter 38, is placed in front of the television receiver 44 screen. These images are transmitted through a second half-silvered dicloric mirror 48 and combined with images transmitted from the receiver 52, whose images are transmitted to the mirror 48 through a green filter 54. The camera 34 is connected to the receiver 52 through a picture storage device 56 which may be in the form of a conventional video tape recorder. A timer is connected to the picture storage device 56 so that images on the screen of receiver 52 are delayed with respect to the images projected on the screen of receiver 44.

Thus, as can readily be seen, should the scene, such as that of FIG. 1, be transmitted from the cameras 32 and 34 to the receivers 44 and 52, respectively, a color scene may be viewed by a person viewing the mirror 48. Moreover, should movement occur in the scene such as that described in FIG. 2, during the delay the viewer will notice such a color observation by noting the simultaneous display of the object 16 with its various positions, until finally the storage device "catches up" with the instantaneous transmitted picture and the object 16 shown lying on the desk of the display in its natural color once again. Thus, the viewer can detect movement of the object 16. In other words, should the observer be viewing the scene with a conventional television monitor, he would carefully have to observe the scene during the movement of the object 16 in order to detect movement. However, utilizing the embodiment of FIG. 3, the initial position of the object 16 and the moved position of object 16 would both be shown simultaneously for the duration of the desired delay. Moreover, portions of the object would be depicted in red and green, calling the viewer's attention thereto immediately.

Figure 5:
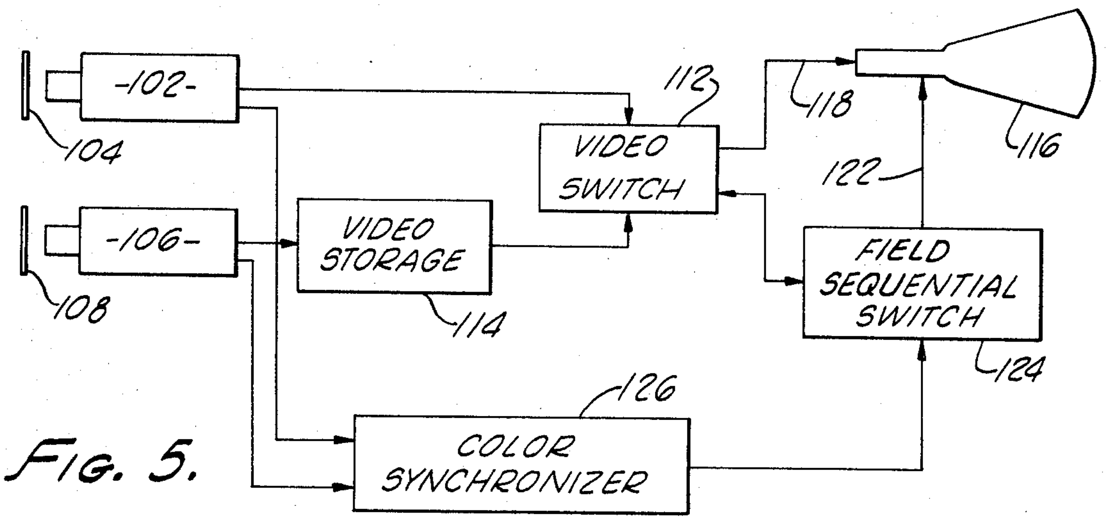
FIG. 5 illustrates an alternative arrangement of the motion detection system of FIG. 3.
Figure 4:
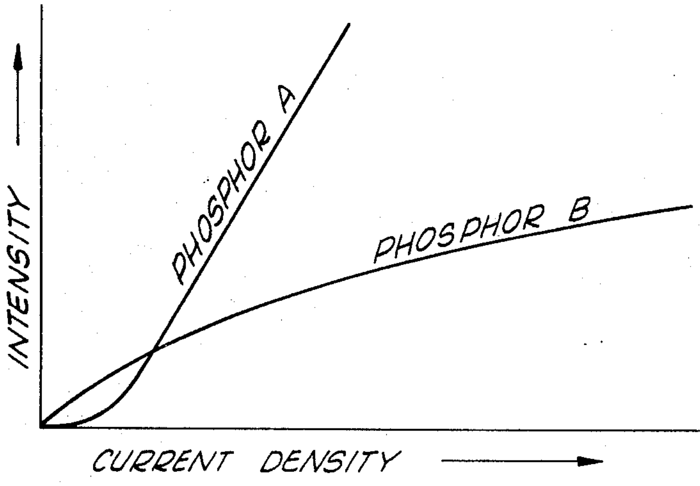
FIG. 4 graphically illustrates the intensity-current density response curves of a single gun color tube which could be used in an embodiment of the invention.

Referring now to FIG. 5, there is shown an alternative embodiment of the motion detection system utilizing but a single gun cathode ray tube which may be of the type F-3522 produced by ITT Electron Tube Division, Fort Wayne, Ind. This type of tube contains a phosphor screen which changes color as the current density is changed. Color shift is obtained by combining a phosphor having "super-linear" intensity vs. current density behavior with a phosphor having a linear or sub-linear behavior and a different emission color. This effect is illustrated in FIG. 4 where curve A represents a super-liner phosphor and curve B represents a sub-linear phosphor. At low current density, the emission color will be that of phosphor B but as the current density is increased, phosphor A will contribute more and the color will shift toward that of A and the brightness will increase along with the color shift and since phosphor B continues to contribute color, the color of the higher current density will not be that of color A, but will be intermediate between color A and color B. For example, if phosphor A is red and phosphor B is green, the color will shift from green to yellow to orange. Similarly, other color combinations will give other color shifts.

Referring again to FIG. 5, there is shown an embodiment of the invention utilizing the above mentioned cathode ray tube. A first television camera 102 contains a green filter 104 in front of its lens, and a second television camera 106 contains an orange filter 108 in front of its lens. The output of camera 102 is transmitted directly to a video switch 112 and the output of camera 106 is transmitted to the switch 112 through a video storage device 114. A video output is displayed on a cathode ray tube 116 which is of the previously described type having a phosphor screen which changes color as the current density is changed. The video switch 112 alternately applies the output of cameras 102 and 106 to the terminal 118 of the tube 116, the output of the camera 106, of course, being first stored in the video storage device 114, for a predetermined amount of time. The grid 122 of the cathode ray tube 116 is connected to a field sequential switch 124 which switches the bias levels of the tube 116 from a low current density wherein the tube will produce a color having a wavelength similar to that of the filter 104, to a higher current density having a wavelength similar to that of the filter 108. A color synchronizer 126 is connected between the television cameras and a field sequential switch to control the rate of switching of the field sequential switch so that each television camera can display an interlaced frame. Thus, by connecting the field sequential switch to the video switch, the video switch alternately switches the video signal from each of the cameras 102 and 106 onto the terminal 118 of the tube 116, while simultaneously the field sequential switch is switching the bias level of the cathode ray tube. Thus, when the video signal from camera 102 is applied to the cathode 118, the field sequential switch applies a low current density to the grid of the tube, whereas when the video signal from the storage device 114 is applied to the cathode 118 through the video switch 112, the bias level is switched to the high current density.

Alternatively, of course, a single television camera could be used having a mechanical color filter changer which would alternately apply the filters 104 and 108 in front of the lens of the television camera.

Moreover, it should be understood that the system could use two guns of a conventional three-gun color television camera together with the complementary two guns of a conventional three-gun receiver.

Also, it should be understood that the invention could be applicable to recording and reproducing two still slides of the same scene taken at different times.

What is claimed is:

1. A system for detecting motion of a portion of a visual scene by processing sequential images of said scene, comprising:

means for generating first and second discrete black and white filtered images of said scene, said means including associated filters to discriminate in favor of the lower frequency visible spectrum in the generation of said first image and in favor of the higher frequency visible spectrum in the generation of said second image;

first and second scanning means for converting said first and second filtered images into corresponding electrical signals, respectively; first and second display means, for reestablishing said first and second filtered images from said electrical signals, said first and second display means being synchronously scanned with said first and second scanning means, respectively;

combiner means for superimposing said reestablished first and second filtered images to produce a color display;

and delay means for delaying one of said electrical signals to produce an area of color variation in said color display corresponding to displacement of a portion of said visual scene during the period of said time delay.

2. Apparatus according to claim 1 in which said first and second scanning means and the corresponding display means comprise a pair of closed circuit television systems.

3. Apparatus according to claim 1 in which said first and second scanning means comprise a pair of black and white television cameras and said first and second display means comprise a pair of cathode ray tube displays each synchronously scanned with the corresponding camera, and said electrical signals are the video output signals of said cameras.

4. Apparatus according to claim 3 including third filter means at the output of said first display means, said third filter means having substantially the same optical pass-band as said filter means associated with said first filtered image, and fourth filter means at the output of said second display means, said fourth filter means having substantially the same optical pass-band as said filter means associated with said second filtered image.

5. A motion detecting system comprising:

first means for recording first and second black and white images representative of an illuminated visual scene at corresponding first and second different times, said first image being recorded in light emphasized within a first passband and said second image being recorded in light substantially within a second passband different from said first passband;

means for combining said first and second images, including display means for presenting said combined images visually;

and first and second filter means associated with said combining means, said first filter being arranged to filter light from said first image and said second filter being arranged to filter light from said second image both before being combined for said display, said filters having different passbands, the lower pass-band filter being applied to the light from the one of said images recorded with emphasis on the lower of the two passbands of emphasis associated with said image recording, said display reproducing the colors of said visual scene and also exhibiting color disparities in areas of said scene wherein said first and second images are not congruent thereby to detect motion of any portion of said visual scene in the time between recordation of said first and second images.

6. Apparatus according to claim 5 in which said means for recording said first black and white images includes first and second closed circuit television camera and cathode-ray display combinations arranged to monitor said visual scene and means are included for effecting recording of said visual scene at said first and second different times comprising a delay circuit within the signal path from camera to cathode-ray display in one of said closed circuit television combinations.

* * * * *